Sept. 25, 1951  H. J. MUMMA  2,568,758
EGG TOTALIZER

Filed March 14, 1950  4 Sheets-Sheet 1

INVENTOR
HAROLD J. MUMMA
BY Hans G. Hoffmeister
ATTORNEY

Sept. 25, 1951  H. J. MUMMA  2,568,758
EGG TOTALIZER
Filed March 14, 1950  4 Sheets-Sheet 2
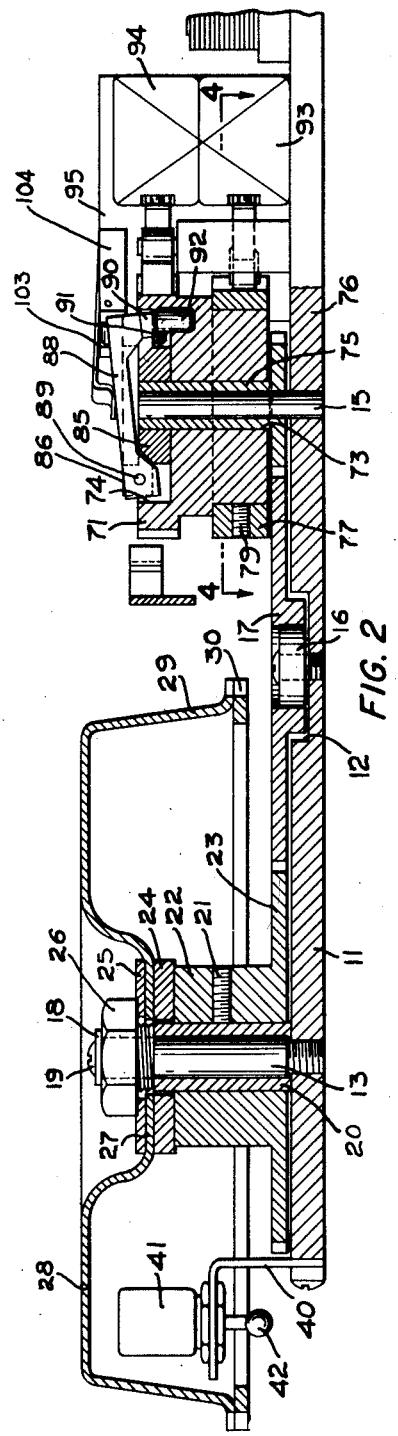
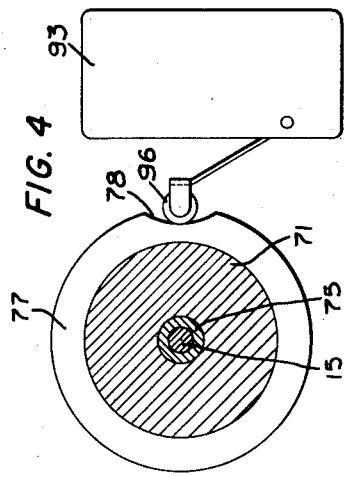
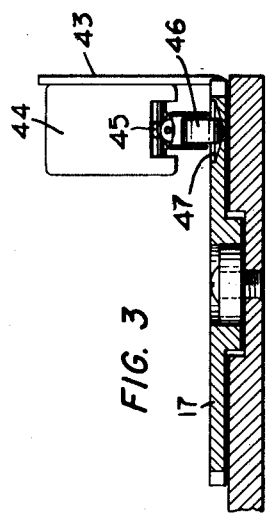
INVENTOR
HAROLD J. MUMMA
BY *Hans G. Hoffmeister*
ATTORNEY Sept. 25, 1951  H. J. MUMMA  2,568,758
EGG TOTALIZER
Filed March 14, 1950  4 Sheets-Sheet 3

INVENTOR
HAROLD J. MUMMA

BY Hans G. Hoffmeister

ATTORNEY

Sept. 25, 1951

H. J. MUMMA 2,568,758

EGG TOTALIZER

Filed March 14, 1950

INVENTOR
HAROLD J. MUMMA

BY *Hans G. Hoffmeister*

ATTORNEY

Patented Sept. 25, 1951

2,568,758

UNITED STATES PATENT OFFICE 2,568,758

EGG TOTALIZER

Harold J. Mumma, Riverside, Calif., assignor to Food Machinery and Chemical Corporation, San Jose, Calif., a corporation of Delaware Application March 14, 1950, Serial No. 149,630

6 Claims. (Cl. 235—92)

This invention relates to totalizing devices and represents an improvement of an egg totalizer disclosed and claimed in my co-pending application for U. S. Letters Patent, Serial No. 25,351, filed May 6, 1948, now Patent No. 2,540,751 issued February 6, 1951, and this application is a continuation-in-part of said co-pending application.

It is an object of this invention to provide an egg totalizer of improved design and particularly one which will have a fewer number of parts and which will be more reliable in operation while performing the same end functions as the egg totalizer covered by my co-pending application aforesaid.

The manner of accomplishing the foregoing objects as well as further objects and advantages will be made manifest in the following description taken in connection with the accompanying drawings in which:

Fig. 2 is a sectional view on the line 2—2 of Fig. 1.

Fig. 3 is a vertical sectional view taken on the line 3—3 of Fig. 1.

Fig. 4 is a horizontal sectional view taken on the line 4—4 of Fig. 2.

Figure 1:
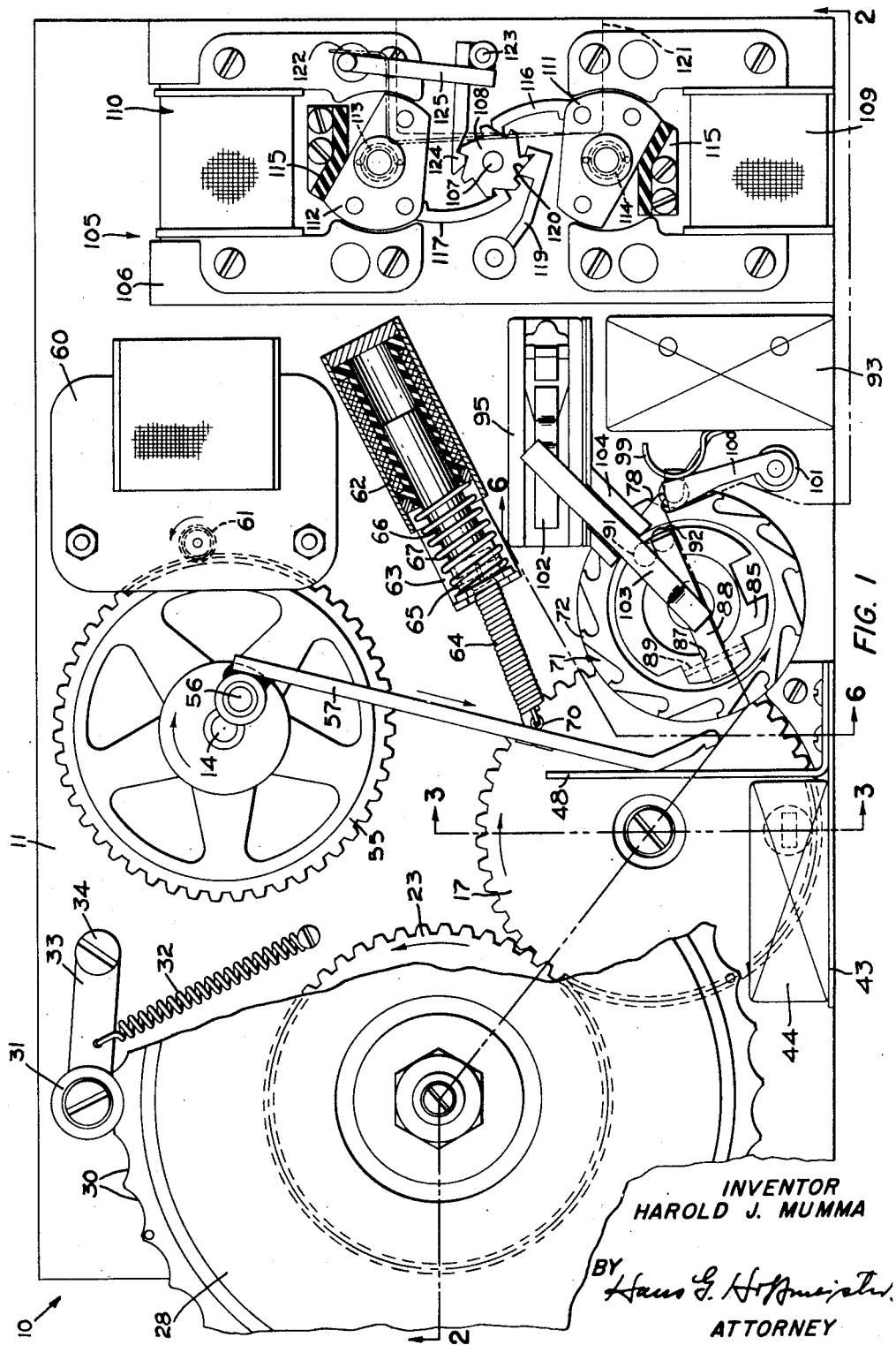
Fig. 1 is a plan view of a preferred embodiment of the invention with certain elements thereof broken away to reveal structure otherwise hidden and with the ratchet dog control solenoid shown in section.

Referring specifically to the drawings, Fig. 1 shows an egg totalizer 10 which includes a base plate 11 having a shallow bore 12 formed therein and having mounted thereon shafts 13, 14, and 15 which extend vertically upward therefrom.

Fixed in the bore 12 is an anti-friction bearing 16 on which is mounted a gear 17. The upper end of shaft 13 has a washer 18 secured thereon by a screw 19 so as to trap a sleeve 20 on said shaft, leaving said sleeve freely rotatable thereon. Surrounding the sleeve 20 and fixed thereto as by a set screw 21 is the hub 22 of a gear 23 which meshes with gear 17.

Also surrounding the sleeve 20 are washers 24 and 25, the upper end of the sleeve 20 being threaded to receive a nut 26 which is turned down to clamp the washers 24 and 25 on the central web 27 of a manually rotatable indicator bell 28. Formed in the periphery 29 of the bell 28 are notches 30 into which a detent roller 31 is urged by a spring 32. Roller 31 is mounted on an arm 33 which is pivotally connected by a screw 34 to the base plate 11.

Figure 8:
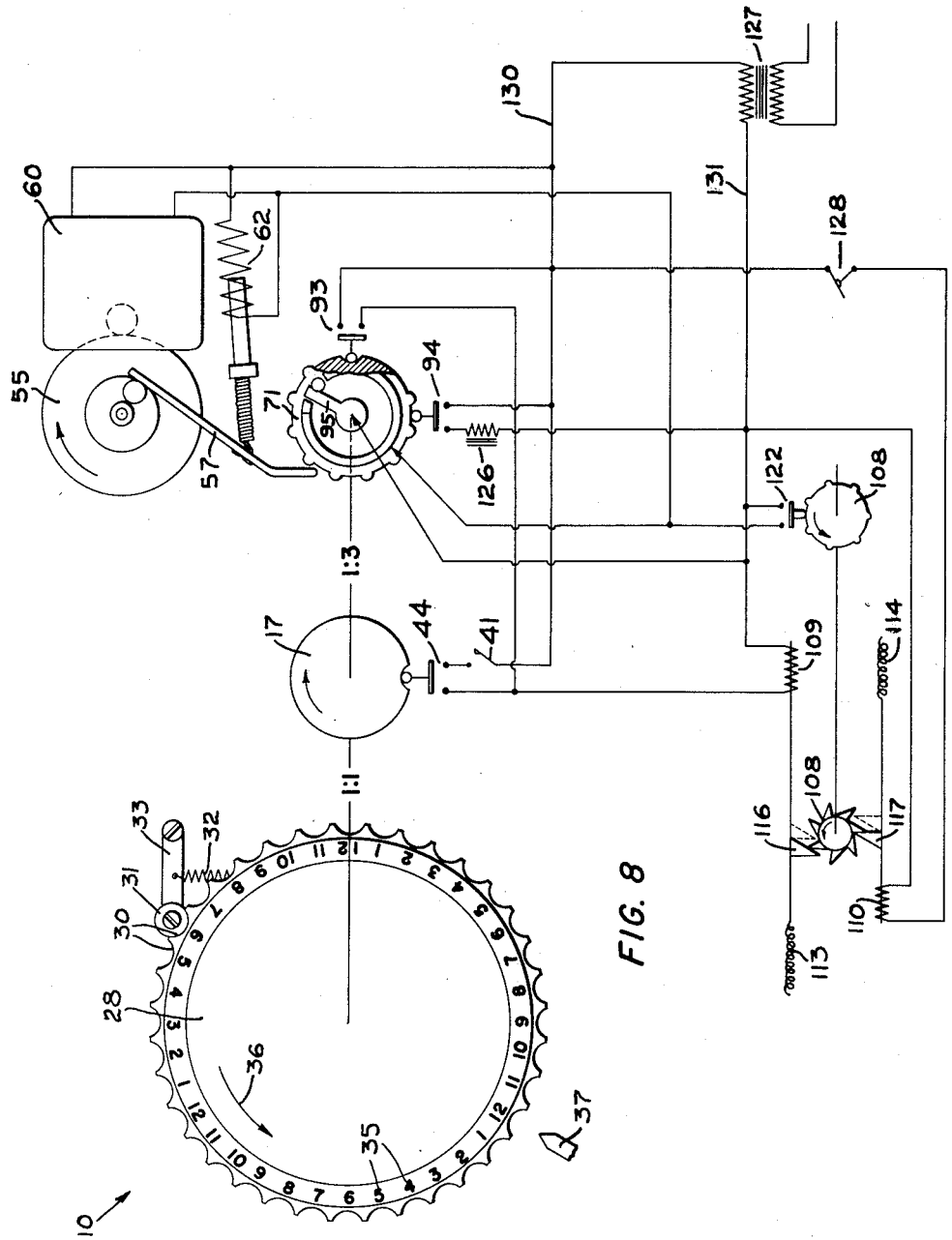
Fig. 8 is a wiring diagram of the electrical system of the invention.

The indicator bell 28 is provided with a series of numerals 35, one of which is disposed opposite each of the notches 30 as shown in Fig. 8. There are thirty-six notches 30 formed in the periphery of the bell 28 and the numerals are arranged in three sets with numerals in each set from one to twelve. These numerals are arranged in clockwise order while the bell 28 is adapted to rotate in the direction of the arrow 36 which is anti-clockwise.

Also provided on the base plate 11 is a pointer 37 which points at one of the numerals 35 whenever the apparatus 10 has just completed a counting operation, the detent roller 31 assisting in halting the indicator bell 28 by its being forced into the next one of the notches 30 when the bell 28 ceases to be driven.

Mounted on a bracket 40 fixed on the base plate 11 is a manually operable switch 41, the throw lever 42 of which extends downwardly below the lower edge of the bell. Fixed on the upper surface of the base plate 11 extending vertically therefrom along one edge adjacent the gear 17 is a bracket 43 on which a switch 44 is mounted, this having an actuating arm 45 carrying a roller 46 which is adapted to ride on the upper surface of the gear 17 or drop into a hollow 47 formed therein. The bracket 43 has a ratchet dog guide 48 extending therefrom over the gear 17.

Rotatably mounted on the shaft 14 is a gear 55 having a crank pin 56 on which one end of a ratchet dog 57 is pivoted.

Also mounted on the base plate 11 is an electric motor 60, this having a pinion 61 extending downwardly therefrom and meshing with the gear 55. Fixed on the base plate 11 is a solenoid 62 having a U-shaped hood 63 extending from the open end thereof. This hood is apertured to permit a tightly coiled contractile spring 64 to extend therethrough and connect with the flanged head 65 of an armature 66 which is slidable in the solenoid 62. An expansive wire spring 67 is coiled about the armature 66 between the armature head 65 and the solenoid 62. This normally retains the armature 66 in extended position as shown in Fig. 1. The opposite end of the spring 64 is attached to an eye 70 provided on the dog 57 and the normal positioning of the armature 66 as shown in Fig. 1 results in the spring 64 swinging the dog 57 into contact with the guide 48.

Mounted on shaft 15 is a ratchet wheel 71 having twelve teeth 72 formed on the periphery thereof at its upper end. The ratchet wheel 71 has a bore 73, the upper end of which is enlarged by a counter bore 74. Freely rotatable in the bore 73 is the stem sleeve 75 of a gear 76 which meshes with the gear 17. The lower end of the ratchet wheel 71 is turned down to receive an annular cam 77, the periphery of which is cylindrical with the exception of a short hollow 78 formed therein. The annular cam 77 is adjustably secured to the ratchet wheel 71 by a set screw 79.

Fixed on the upper end of the sleeve 75 so as to be non-rotatable relative thereto and so as to be disposed within the counter bore 74 of the ratchet wheel 71 is a switch actuator 85 on the upper outer edge of which a rim 86 is formed. This rim has diametrically opposite radial slots 87, a lever 88 lying in said slots and having one end thereof pivoted on a pin 89 resting in a hole bored in the switch actuator 85. The opposite end of the lever 88 has a downwardly extending helically beveled nose 90.

The actuator 85 is adapted to be rotated by the ratchet wheel 71 when a pin 91 mounted in the actuator is engaged by a pin 92 mounted in the ratchet wheel. When these pins are thus brought into engagement, the pin 92 engages and lifts the nose 90 of the lever 88, thus swinging the middle of the lever upwardly (as shown in Fig. 2) and maintaining it thus so long as the pin 92 engages the pin 91.

Mounted on the plate 11 are switches 93, 94, and 95. The switch 93 is actuated by a cam follower roller 96 which rides against the periphery of the cam 77. The switch 94 is actuated by an arm 99 which rides against a ratchet wheel keeper dog 100 which is pivotally mounted on a post 101 fixed upon and rising from the base plate 11. The dog 100 rides on the ratchet teeth 72 and drops in behind each of these as it passes the dog so as to prevent reverse movement of the ratchet wheel 71.

Figure 6:
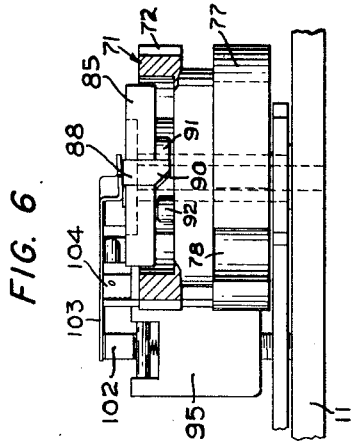
Fig. 6 is a sectional view taken on the line 6—6 of Fig. 1 with the ratchet wheel partly in section so as to disclose the manner in which the secondary motor control switch is actuated manually to indicate a given number and to start the motor running.
Figure 7:
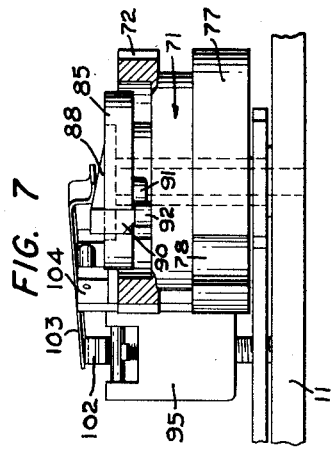
Fig. 7 is a view similar to Fig. 6 and illustrates the manner in which said secondary motor switch is automatically opened after the motor actuates the counter a number of times equal to that indicated by the manual control.

The switch 95 is actuated by an arm 102 which is in turn actuated by a lever 103, the latter being pivoted on a bracket 104 which extends from switch 95 over the ratchet wheel 71, the outer end of lever 103 bending down into contact with the middle portion of lever 88 as shown in Figs. 2, 6, and 7.

Also mounted on the base plate 11 is a motor control impulse relay 105. This includes a mounting plate 106 which is secured to the base plate 11 and on which is fixed a vertical shaft 107. Freely rotatable on this shaft is a ratchet wheel 108. Mounted on the plate 106 on opposite sides of the shaft 107 are solenoids 109 and 110. These solenoids have armatures 111 and 112 and springs 113 and 114 which hold these armatures against stops 115 when the solenoids 109 and 110 are de-energized. The armatures 111 and 112 carry dogs 116 and 117 which idle over the teeth of the ratchet wheel 108 when the solenoids 109 and 110 are energized but which engage the teeth of the ratchet wheel and turn the latter when the solenoids are de-energized and the armatures 111 and 112 are returned against the stops 115 by the springs 113 and 114.

Also mounted on the plate 106 is a spring actuated detent 119 which either rests within one of the notches between adjacent teeth of the ratchet wheel 108 or comes to rest with one of said teeth entering a notch 120 provided in the end of the detent 119. The purpose of the detent is to prevent rotation of the ratchet wheel 108 in a counter-clockwise direction and to detain said wheel precisely in successive positions located one-fourteenth of a rotation apart.

Mounted above the relay 105 is a switch 121, having an actuating arm 122. Pivoted on a shaft 123 is a notched arm 124, the end of which engages the ratchet wheel 108, this arm having an arm 125, the tip of which extends upwardly so as to engage the switch arm 122 and actuate the switch 121 each time a tooth of the ratchet wheel rides under the tip of the arm 124.

The egg totalizer 10 actuates a counter 126 and the electrical circuit of the entire device is preferably run by a low voltage current (preferably 28 volts) which is supplied by a transformer 127. As pointed out in my co-pending application aforesaid, the totalizer 10 is normally caused to actuate the counter 126 either twelve times (or once for each of the eggs in a filled carton) or thirty-six times, where a carton containing thirty-six eggs is being packed. The totalizer 10 is set in motion to cause it to thus count all the eggs in a full carton by the latter being pushed from a packing station over a switch 128 which is located between said station and a conveyor belt for carrying cartons away.

The wiring system of the invention shown in Fig. 8 includes leads 130 and 131 from the transformer 127.

The lead 130 connects to one side of each of the following elements: the motor 60, the solenoid 62, the switch 41, the switch 93, the switch 94, and the switch 128. The lead 131 connects to one side of the following elements: the solenoid 109, the solenoid 110, the switch 95, the switch 122, and to the counter 126.

The other side of the switch 41 connects to the other side of switch 44. The other side of switch 94 connects to the other side of counter 126. The other side of motor 60 and solenoid 62 connects with the other side of switches 95 and 122; the other side of switch 44 connects to the other side of solenoid 109; and the other side of solenoid 110 connects to the other side of switch 128.

*Operation*

The function of the totalizer 10 in the packing of eggs is to actuate the counter 126 a number of times which is equal to the number of eggs packed in a certain grade by a given packer out of a given farmer's lot. It is therefore necessary that this counter be actuated once for each of the eggs in each full carton of eggs of that grade packed in that lot. It is also necessary that this counter be actuated once for each of the eggs from that lot that is placed in a carton partially packed from a previously packed lot as is necessary to fill such partially packed carton.

Finally it is necessary that the counter 126 be actuated a number of times equal to the number of eggs of that grade packed from the particular lot in question at the wind up of that particular lot, and which are insufficient in number to fill a carton.

The manner in which these functions are performed will be described by reference mainly to Fig. 8 in which the wiring system of the totalizer is diagrammatically illustrated. Assuming that cartons for holding a dozen eggs are being packed, the switch 41 will be open as shown in this figure. This switch is closed when packing cartons, each of which contains thirty-six eggs, for reasons which will be made clear later.

The apparatus 10 is shown in Fig. 8 as when starting the packing of an empty carton for twelve eggs. Having been filled with twelve eggs, this carton is pushed from the packing station over the switch 128 and onto the carry-away conveyor, this contact with the switch 128 momentarily opening the latter with the following results.

Figure 5:
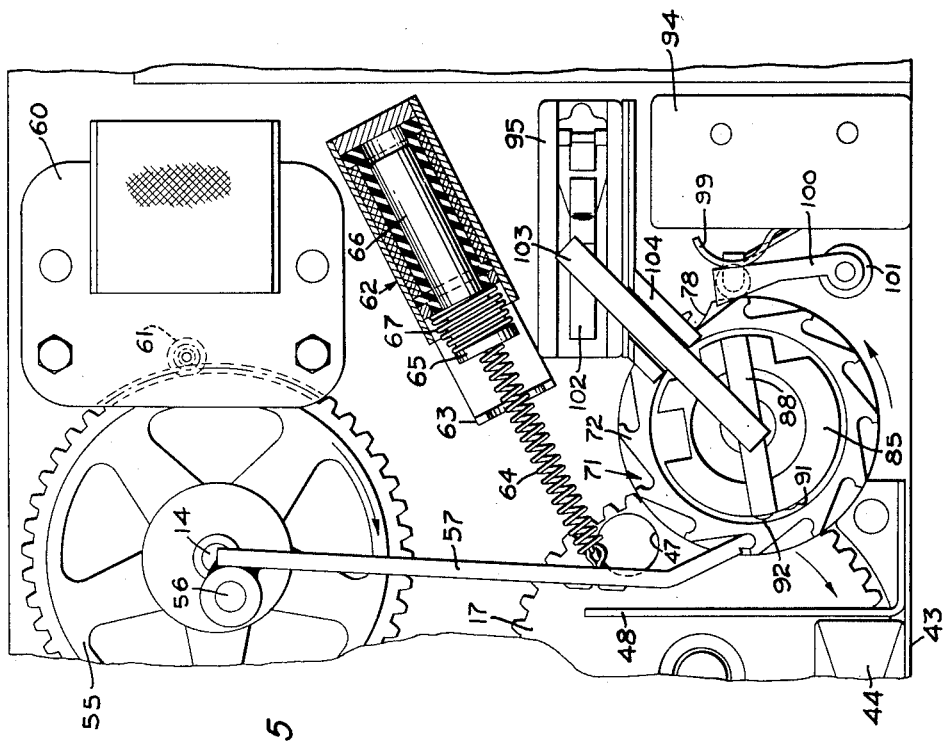
Fig. 5 is a partial plan view similar to Fig. 1 illustrating the ratchet dog control activated to pull said dog into engagement with the ratchet wheel, which occurs whenever the motor for driving the ratchet is energized.

The solenoid 110 is de-energized, permitting the spring 114 to pull on one of the teeth of the ratchet wheel 108 to give the latter a one-fourteenth rotation, and thus close switch 122. This results in closing the circuit of the motor 60 and solenoid 62, thereby pulling the ratchet dog 57 into engagement with the ratchet wheel 71 and starting to reciprocate this dog as shown in Fig. 5, whereby this dog successively engages teeth 72 of the ratchet wheel 71 and with each reciprocation imparts one-twelfth of a revolution to the ratchet wheel. With each of said partial revolutions, the ratchet wheel actuates switch 94 and with each of said actuations this switch closes the circuit of the counter 126 and causes this to add one to the total registered thereby.

With the first actuation of the ratchet wheel 71, switches 93 and 44 are closed, thereby energizing solenoid 109 to retract dog 116 into an operative relation with one of the teeth of the ratchet wheel 108, as shown by broken lines in Fig. 8.

When the ratchet wheel has closed the switch 94 twelve times, so as to cause the counter 126 to register the number twelve, the hollow 78 in the cam 77 arrives opposite the roller 96 of the switch 93, thereby opening this switch, and de-energizing solenoid 109, this permitting spring 113 to turn ratchet wheel 108 one-fourteenth of a revolution which opens switch 122 and de-energizes the motor 60 and the solenoid 62. Immediately upon this happening, the spring 67 of the solenoid expands to shift the dog 57 out of operative relation with the ratchet wheel 71 as shown in Fig. 1.

The sliding of the keeper dog 100 into a notch between adjacent teeth 72 of the ratchet wheel 71, under pressure of the switch spring arm 99 as shown in Fig. 1, tends to halt the ratchet wheel when its actuation by the motor 60 is thus discontinued in a position with the dog 100 engaging one of the teeth 72 as shown in Fig. 1, which position occurs immediately after said dog has ridden over said tooth and dropped in behind the same.

For each successive carton which is filled by eggs packed from this lot of the grade to which the device 10 and counter 126 relate, and which is moved over the switch 128 onto the carry-away conveyor, the device 10 actuates the counter 126 an additional twelve times, which number is added to the count already recorded by this counter.

Assuming that the final eggs packed from this lot in this particular grade ends with a partially filled carton on the packing station, and assuming that seven eggs are in this carton, the operator places her finger in the notch 30 opposite the number seven on the left side of the bell 28, as shown in Fig. 8, immediately preceding the pointer 37, and rotates the bell 28 until this number seven is directly opposite the pointer 37.

During this rotation, as well as during all rotation of the bell 28, the roller 31 idles over the notches 30 and at the end of the manipulation of the bell 28 just described, this roller drops into a notch 30 so as to detain the bell 28 for the time being in the precise position to which it has just been moved.

The rotation of the bell 28 just described is transmitted through the gears 23, 17, and 76 to the switch actuator 85, so as to rotate this seven-twelfths of a revolution. At the start of a rotation thus imparted to the actuator 85, the pins 91 and 92 are in engagement as shown in Fig. 7, and the lever 88 is raised with the nose 90 thereof resting on top of pin 92. Rotation of switch actuator 85 from this position so as to "lead" the ratchet wheel 71 moves pin 92 away from under the nose 90 of lever 88. This results in nose 90 dropping as shown in Fig. 6 until the lever 88 is horizontal, upward pressure of the latter on the lever 103 thus being relieved, thereby permitting the arm 102 of the switch 95 to rise closing the latter, which energizes the motor 60 and solenoid 62 and starts the dog 57 reciprocating in engagement with the ratchet teeth 72 as shown in Fig. 5.

The ratchet wheel 71 is thus progressively rotated until pin 92 has contacted the lever nose 90, lifted the lever 88 as shown in Figs. 2 and 7, and thus opened the switch 95. In view of the fact that the actuator 85 had been rotated seven-twelfths of a revolution in advance of the ratchet wheel 71 by the manual rotation of the bell 28 to bring the numeral seven opposite the pointer 37, a seven-twelfths revolution of the ratchet wheel 71 was necessary to again bring the pin 92 under the lever nose 90 and into engagement with the pin 91 as shown in Fig. 7. During this partial rotation of the ratchet wheel 71, seven teeth thereof passed under the dog 100 thus actuating the switch 94 seven times which in turn causes the counter 126 to add seven to the count registered thereby. With the opening of the switch 95, the motor is de-energized and the solenoid 62 relaxed, thus immediately throwing the ratchet dog 57 out of operative relation with the ratchet wheel 71.

The count of all the eggs of the grade being counted by the counter 126 which have been packed out of the particular lot in question is now reflected by the counter 126. This counter preferably has type printing faces from which the total shown by the counter is now printed on a record card and the counter is returned to zero in readiness for starting the packing of a second lot of eggs.

It is to be borne in mind that at the time of starting the packing of lot two, a carton containing seven eggs from lot one is resting on the packing station. It is therefore necessary to use five eggs from lot two to complete the dozen eggs necessary to fill this carton.

Having placed this many eggs in this carton and thus filled the same, this carton is moved over the switch 128 by the packer and onto the carry-away conveyor. The momentary opening of switch 128 de-energizes the solenoid 110 permitting the spring 114 to shift the dog 117 from its full line position as shown in Fig. 8 to its broken line position therein; thereby rotating the ratchet 108 one-fourteenth of a revolution.

This closes switch 122 which closes the circuit of the motor 60 and solenoid 62 and starts the dog 57 rotating the ratchet wheel 71.

It should be noted that at the time the switch 128 was momentarily opened by the carton which received only five eggs from lot two in order to fill said carton, the cam 77 which is fixed to the ratchet wheel 71 had been turned with said ratchet wheel seven-twelfths of a revolution in completing the count of lot one.

It is now desired to actuate the counter five times for the five eggs placed in the partially filled carton in order to fill the same.

This is accomplished by the rotation of the ratchet wheel 71, from the position in which it was left after having been given seven-twelfths revolution to the position in which it is shown in Fig. 8. A full revolution of the ratchet wheel 71 is thus completed by a five-twelfths revolution thereof which results in the switch 93 being opened, thereby de-energizing solenoid 109 which opens switch 122 and de-energizes the motor 60 and solenoid 62.

It is to be noted that while the seven-twelfths revolution of the ratchet wheel 71 was taking place in order to complete the total count of eggs packed from lot one, pins 91 and 92 were not in engagement and therefore the counter actuator 85 and the bell 28 connected therewith by gearing did not rotate. Thus when starting to pack eggs from lot two, the bell 28 remained with that same numeral seven disposed opposite the pointer 37. At the beginning of the counting of the first five eggs packed out of lot two (which were needed to fill said carton) the pins 91 and 92 were in engagement and the five-twelfths rotation of the ratchet wheel 71 was transmitted through the gears 76, 17, and 23 to the bell 28 to rotate the latter five-thirty-sixths of a revolution, thereby bringing the next numeral twelve opposite the pointer 37.

The condition of the apparatus 10 at the conclusion of the counting of said five eggs first packed from lot two to fill a partially filled carton is as shown in Fig. 8. The use of the apparatus 10 from now on is merely repetitive of one or the other of the operations above described.

In case this apparatus is used in connection with cartons which hold thirty-six eggs, the switch 41 is closed so that the opening of the switch 93 no longer has any effect on the apparatus except when switch 44 is also open. It is now to be noted that gear 17 has a one to one relation with gear 23 and the gear 76 has a three to one relation with the gear 17. Thus the gear 17 rotates once while the gear 76 rotates three times, and as long as the pins 91 and 92 remain in contact, the ratchet wheel 71 rotates three times for each revolution of the gear wheel 17.

Momentary opening of the switch 128, therefore, as by pushing a filled thirty-six egg carton thereover causes the switch 122 to close, thereby energizing the motor 60 and the solenoid 62. This starts to rotate the ratchet 71 which rotation is transmitted to the gear 17 and the bell 28. This rotation continues with the actuation of the counter 126 for each impulse given to the ratchet wheel 71 until the latter has been rotated three times and thirty-six has been added to the total registered by the counter 136 before the hollow 47 on the gear 17 is again brought opposite the roller 46, permitting the latter to drop into this hollow and open switch 44.

This permits the opening of switch 93, which follows almost immediately, to de-energize solenoid 109, permitting the spring 113 to act on the ratchet wheel 108 to open switch 122 and thus de-energize motor 60 and solenoid 62 thereby halting the rotation of the ratchet wheel 71 in the precise position in which it is shown in Fig. 1.

When using thirty-six egg cartons, the actuation of the counter 126 to count the eggs in a partially filled carton and subsequently to count the eggs necessary to complete the filling of the carton are accomplished in exactly the same manner as described with regard to twelve egg cartons.

The claims are:

1. In a device for actuating a counter, the combination of: a ratchet wheel, the number of teeth on which are equal to a standard number; reciprocating electromotive means for rotating said ratchet wheel one tooth at a time; a counter control switch having means for engaging said teeth whereby said switch is actuated and in turn actuates said counter once for each time one of said teeth passes said means; primary control means for starting said electromotive means to operate repeatedly; primary stop means responsive to a complete single revolution of said ratchet wheel to stop said electromotive means; a rotor mounted concentrically with said ratchet wheel and adapted to be rotated by said ratchet wheel by the engagement of pins, one of which is on said ratchet wheel and one of which is on said rotor, being rotatable to separate said pins whereby said rotor will be disposed any desired portion of an approximately complete revolution in advance of said ratchet wheel; a secondary switch for starting said electromotive means repeatedly operating; and means responsive to an advance rotation of said rotor as aforesaid to close said secondary switch, thereby causing said electromotive means to rotate said ratchet wheel and actuate said counter switch and said counter a lesser number of times than said standard number and until said pins are again brought together, said secondary switch actuating means being responsive to said ratchet wheel catching up with the advanced position of said rotor to open said secondary switch and halt said electromotive means.

2. A combination as in claim 1, in which the next successive actuation of said primary control means following a partial rotation of said ratchet wheel as aforesaid causes another partial rotation of said ratchet wheel, in this instance just sufficient to actuate said counter a number of times which when added to said lesser number will equal said standard number, said primary stop means thereupon halting said electromotive means.

3. A combination as in claim 2 having a finger dial adapted for manual operation to indicate a selected number less than said standard number; and means connecting said dial with said rotor so that the actuation of said dial rotates said rotor in advance of said ratchet wheel through an angular movement subtending a number of ratchet teeth equal to said selected number.

4. A combination as in claim 1, in which the means for actuating said secondary switch includes a diametral lever pivotally mounted at one end thereof on said rotor and vertically responsive at its opposite end to engagement with the pin on said ratchet wheel whereby said secondary switch is closed when said lever is moved out of engagement with said pin by rotation of said rotor, and said switch is opened when said pin again engages said lever by virtue of the rotation of said ratchet wheel.

5. A combination as in claim 1 in which said electromotive means comprises a gear wheel and an electric motor for driving said gear wheel; a crank pin on said gear wheel; a ratchet dog pivotally mounted on said crank pin; a solenoid included in the circuit of said motor; and means connecting the armature of said solenoid with said ratchet dog whereby the energizing of said motor circuit starts said motor and energizes said solenoid to cause the latter to pull said dog into operative relation with said ratchet wheel; and means operative upon the de-energizing of said solenoid to move said dog out of operative relation with said ratchet wheel.

6. A combination as in claim 1 in which the next successive actuation of said primary control means following a partial rotation of said ratchet wheel as aforesaid causes another partial rotation of said ratchet wheel, in this instance just sufficient to actuate said counter a number of times which, when added to said lesser number, will equal said standard number, said primary stop means thereupon halting said electromotive means; a finger dial adapted for manual operation to indicate a selected number less than said standard number; means connecting said dial with said rotor so that the actuation of said dial rotates said rotor in advance of said ratchet wheel through an angular movement subtending a number of ratchet teeth equal to said selected number; said means for connecting said dial to said rotor including a gear on said rotor, a gear on said dial, and an intermediate gear meshing with the aforesaid gears, the number of teeth on said intermediate gear being a multiple of the number of teeth on said rotor gear; and alternate secondary stop means associated with said intermediate gear and adapted to be substituted for said primary stop means associated with said ratchet wheel and which, when so substituted, is operative to cause said electromotive means to remain in operation when started by said primary control means until said intermediate gear has turned through a complete revolution since the last previous stopping of said electromotive means by said alternate stop means whereupon said alternate stop means functions automatically to halt said electromotive means.

HAROLD J. MUMMA.

No references cited.